Dec. 13, 1927.
T. A. BANNING, JR
1,652,515
FUEL FEEDING AND METERING SYSTEM
Filed July 13, 1925
6 Sheets-Sheet 1
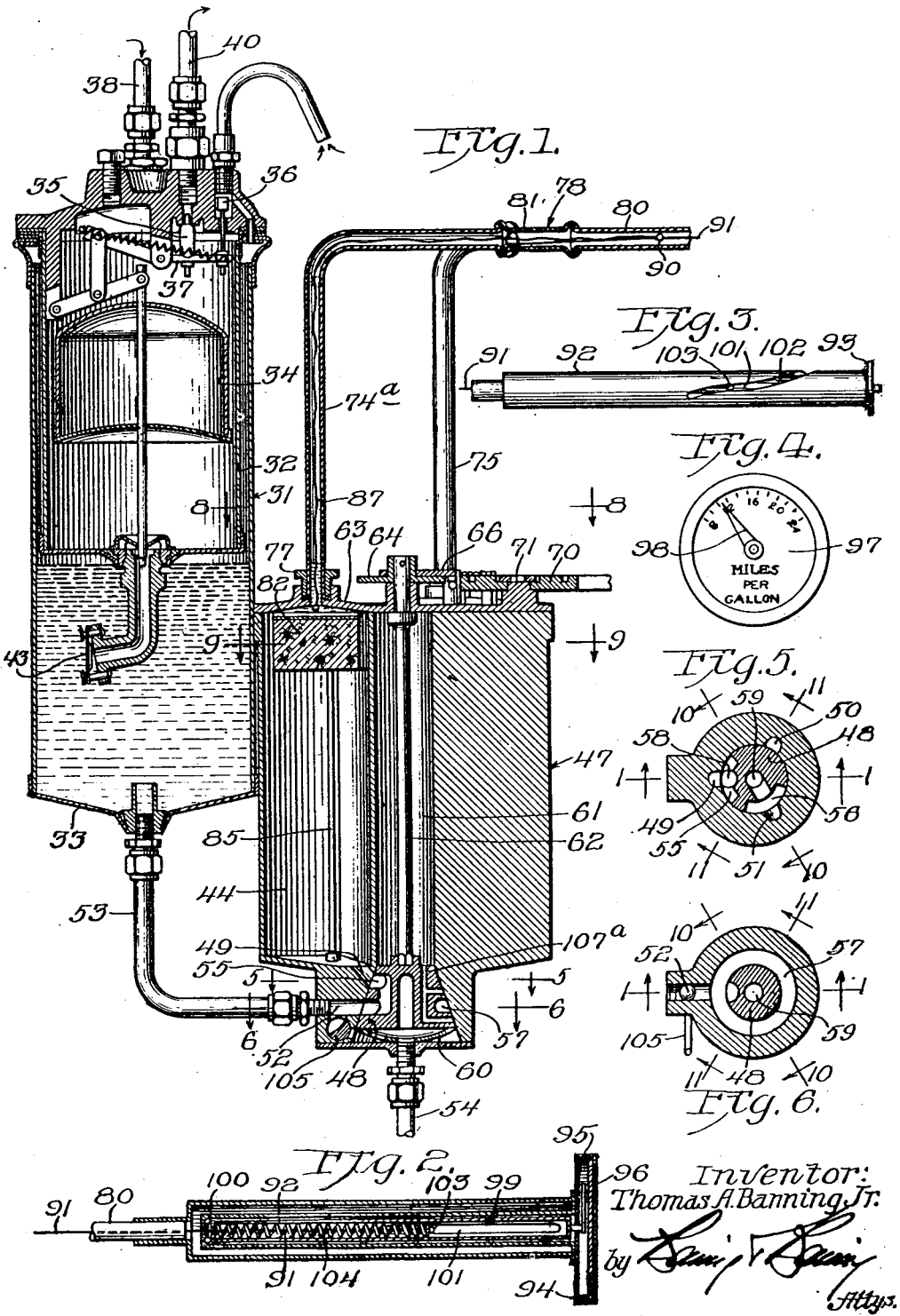
Inventor:
Thomas A. Banning, Jr.

Dec. 13, 1927.
1,652,515
T. A. BANNING, JR
FUEL FEEDING AND METERING SYSTEM
Filed July 13, 1925 6 Sheets-Sheet 2
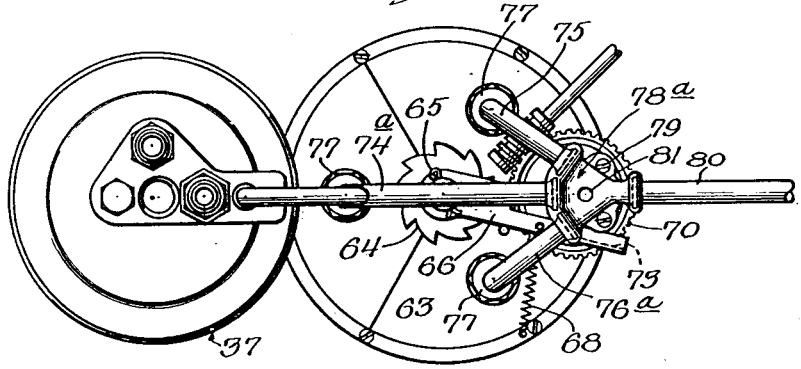
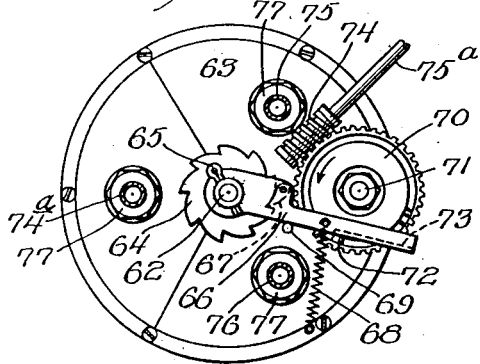
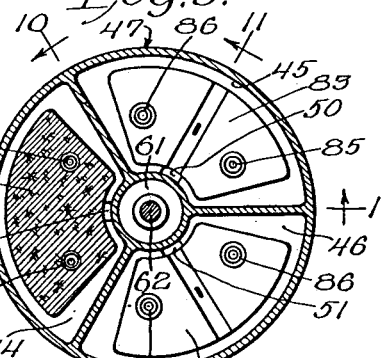
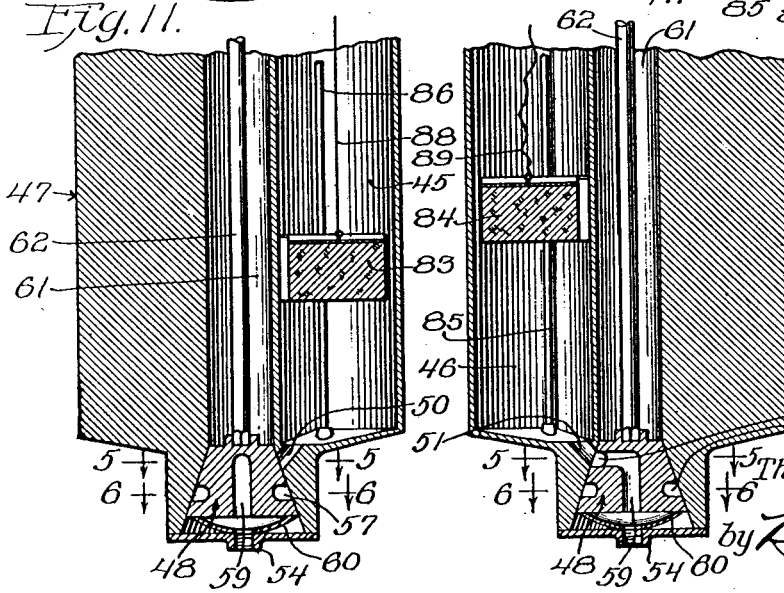

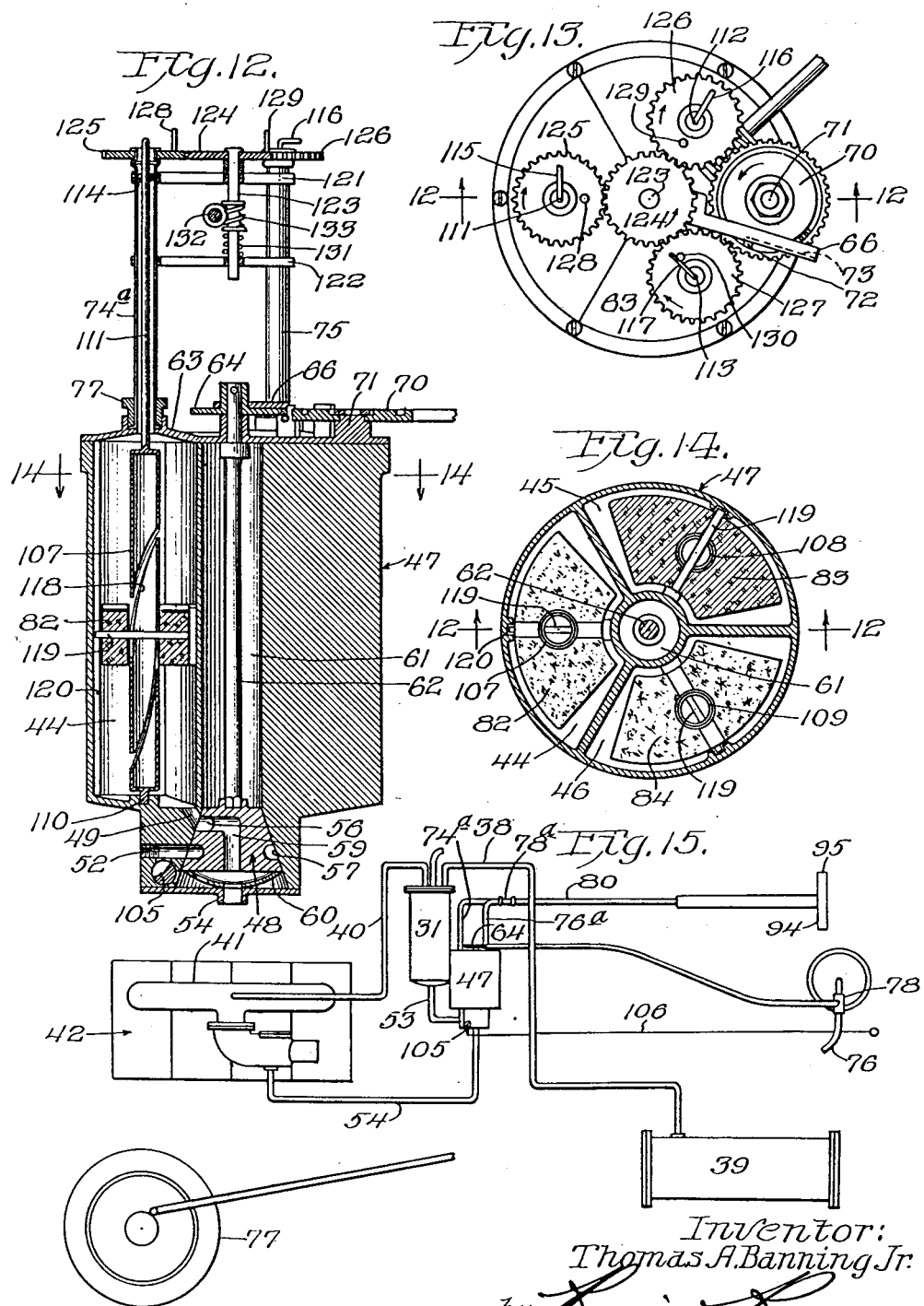

Dec. 13, 1927.
T. A. BANNING, JR
1,652,515
FUEL FEEDING AND METERING SYSTEM
Filed July 13, 1925   6 Sheets-Sheet 4
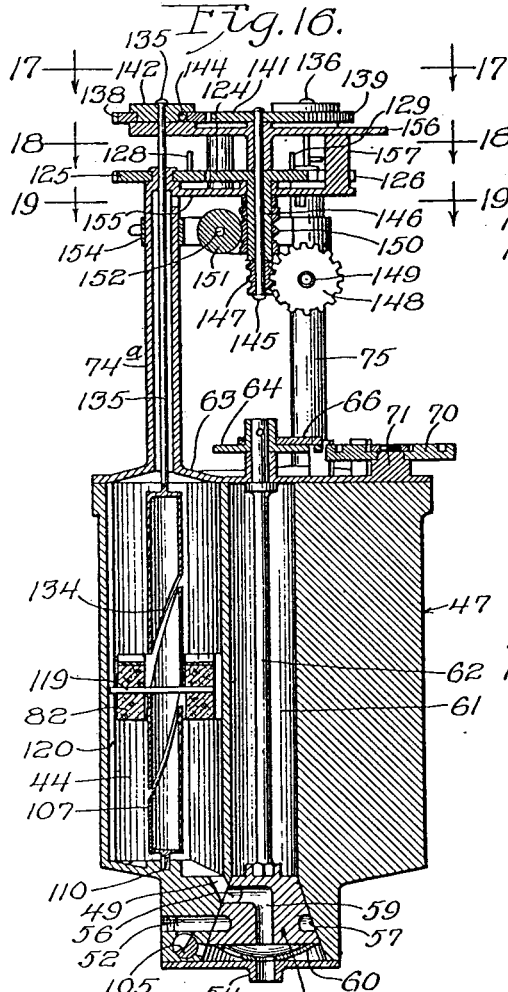
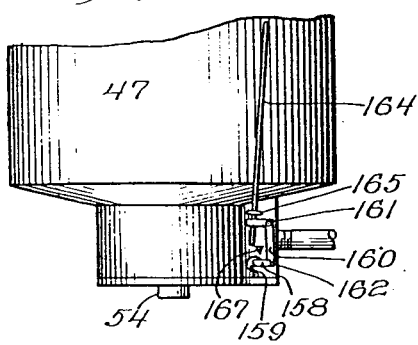
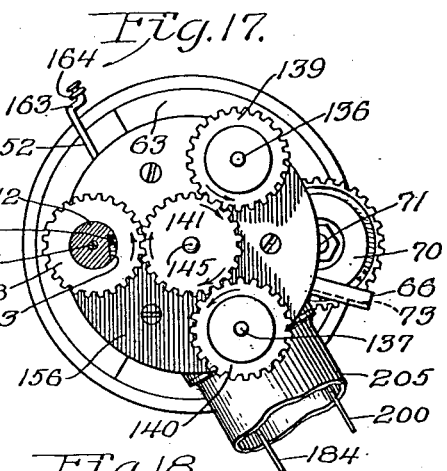
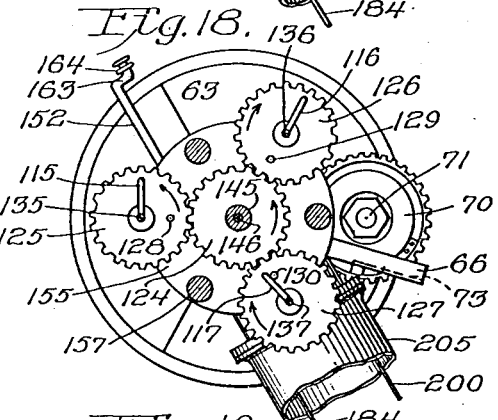
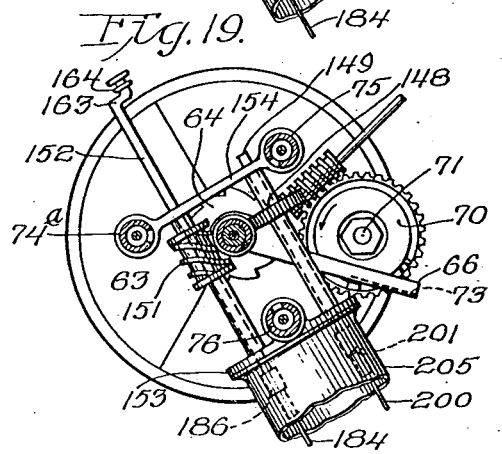
Inventor:
Thomas A. Banning Jr.
by
Attys.

Dec. 13, 1927.
T. A. BANNING, JR
1,652,515
FUEL FEEDING AND METERING SYSTEM
Filed July 13, 1925   6 Sheets-Sheet 5
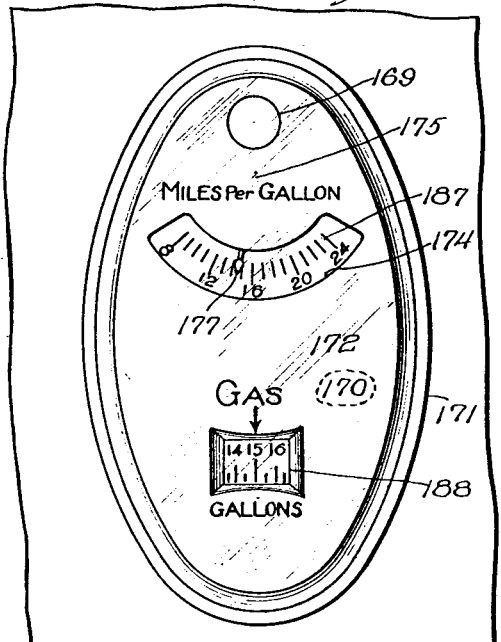
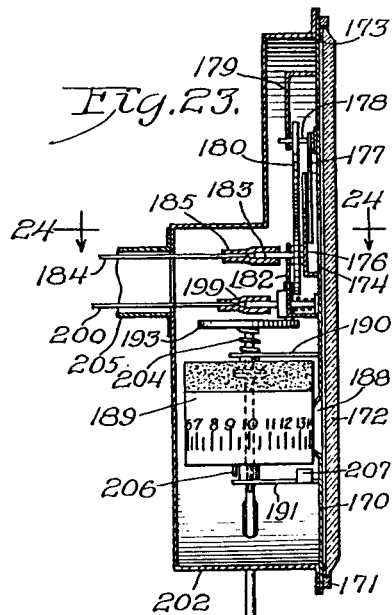
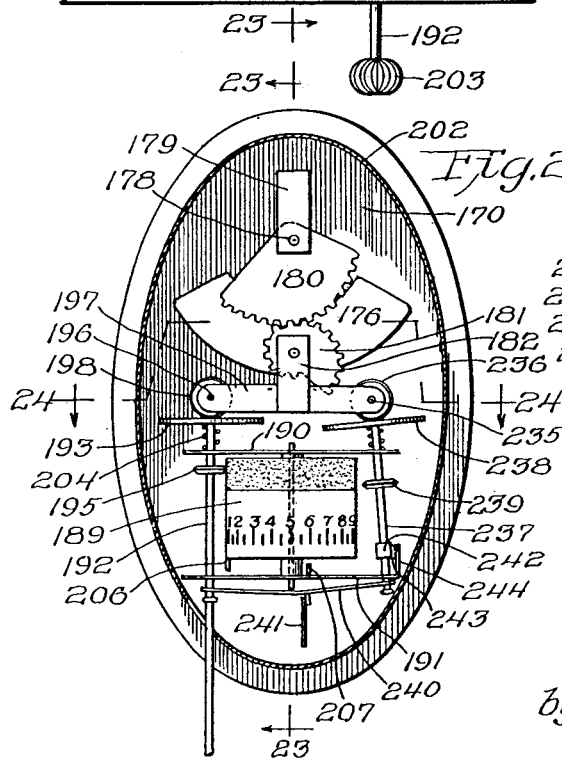
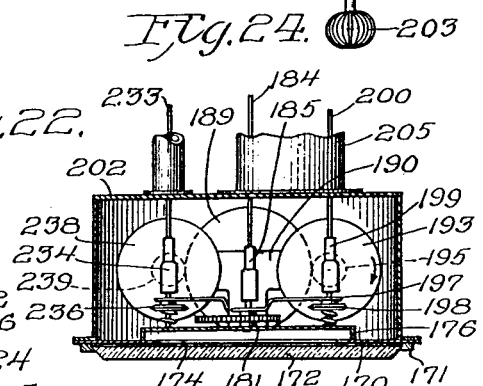
Inventor:
Thomas A. Banning Jr.

Dec. 13, 1927.
T. A. BANNING, JR
1,652,515
FUEL FEEDING AND METERING SYSTEM
Filed July 13, 1925   6 Sheets-Sheet 6
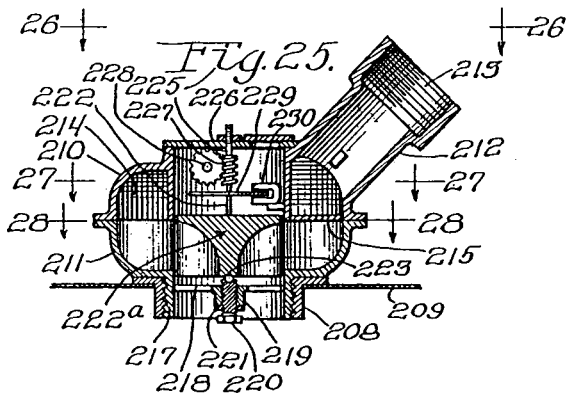
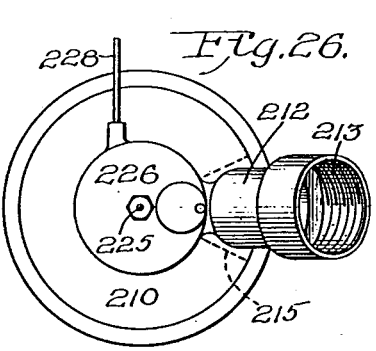
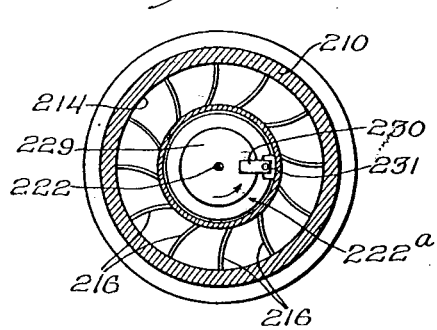
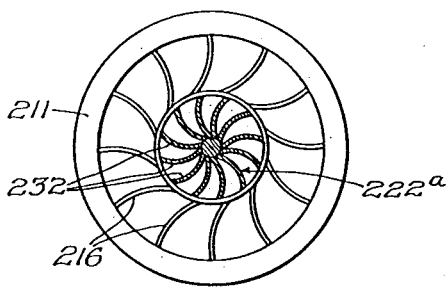
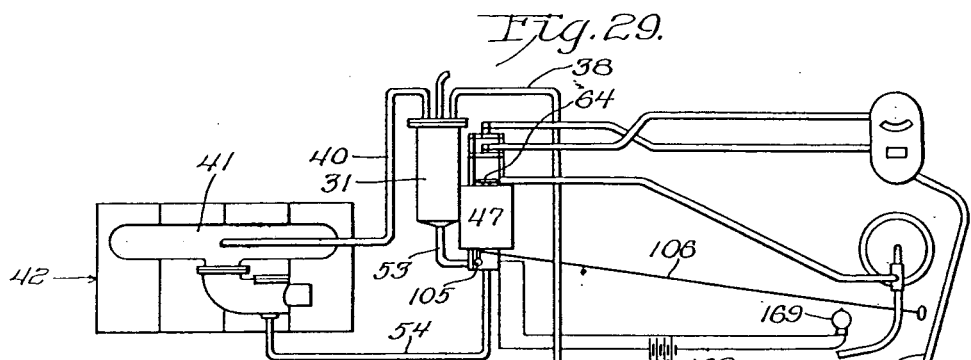
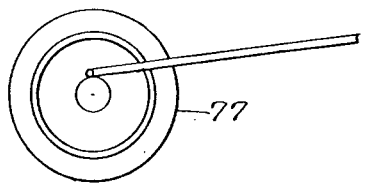
Inventor:
Thomas A. Banning Jr.
by
Attys.

Patented Dec. 13, 1927.

1,652,515

UNITED STATES PATENT OFFICE.

THOMAS A. BANNING, JR., OF WILMETTE, ILLINOIS.

FUEL FEEDING AND METERING SYSTEM.

Application filed July 13, 1925. Serial No. 43,117.

This invention has to do with improvements in fuel feeding and metering systems. It has to do particularly with systems for the feeding and metering of fuel for internal combustion engines, such as are used for the propulsion of automotive vehicles, but it will presently appear that the features of the invention may also be used for many other classes of service. Therefore, I wish it clearly understood that I do not intend to limit myself to the particular class of service above mentioned, except as I may do so in the claims.

One of the features of the invention has to do with the provision of means for metering the fuel against the work performed by the engine, such, for example, as metering the fuel against the road travel of a vehicle. This feature of the invention has to do, among others, with the provision of an arrangement whereby an indication of the economy of operation will be periodically given in miles per gallon or other suitable ratio.

In connection with the foregoing, it is an object of the invention to provide an arrangement whereby the fuel may be metered against road travel on the basis of equal distances of travel, giving a corrected reading of the desired ratio at the completion of each unit of travel. Such indicated ratio is maintained until the completion of another unit of road travel whereon a new and corrected reading is given based upon the performance of the next unit of road travel. In connection with the above, it is an object of the invention to provide means for giving the indication at a convenient point, as, for example, the dash board of the vehicle, by the use of a positive mechanical connection between the metering device and the dash board, as distinguished from an indication based upon hydrostatic pressure or the like. More particularly it is an object to establish the indication at the dash board by the use of one or more floats working in conjunction with the liquid fuel itself, so that the positions of said floats serve to actuate the indicating mechanism.

Another feature in connection with the foregoing is the provision of means for giving the indication by the use of a common indicator working in conjunction with a plurality of metering devices, and by the use of mechanical connections between all of the metering devices and the common indicator, which connections are, however, so arranged as to function in the desired manner.

Another feature of the invention relates to the provision of an arrangement such that substantially uniform scale divisions may be used throughout the usual working portion of the indicator scale, and with the use of metering chambers of uniform cross section, notwithstanding the fact that the ratio of the distance traversed per unit consumed is an inverse ratio. This will make it possible to use metering chambers of full size throughout their vertical dimension, and at the same time secure the desirable result of a scale having its divisions uniformly spaced throughout its normal working range.

A further feature of the invention relates to the provision of means for insuring a continuous and uninterrupted supply of fuel to the engine notwithstanding excessive fuel consumption per unit of distance traversed, and in this connection, it is an object to provide an arrangement such that the device will automatically continue to supply fuel to the engine uninterruptedly for an indefinite length of time, even in those cases in which there is no road travel whatsoever.

A further feature in connection with the foregoing is the provision of an arrangement such that if at any time the ratio of distance traversed per unit of fuel consumed should fall below a certain low limit, the device will immediately commence to deliver fuel to the engine independently of any metering against road travel and will continue to do so until reset by the driver. Thereupon it will again commence to meter against road travel and indicate periodically corrected ratios.

A further object in connection with the foregoing is the provision of means for giving an indication to the driver of the fact that the ratio of distance traversed per unit of fuel consumed has fallen below a certain degree, so that the driver will be advised of the existence of some abnormal condition of operation, such as dragging brakes, flat tire, missing spark plug, or any other of numerous conditions which would result in such low economy.

Another feature of the invention relates to the provision of means for metering the fuel against road travel in conjunction with any suitable system of delivering the fuel to the engine. For example, the arrangement may be used either in connection with vacuum feed systems of the different well known types, or with gravity feed systems, or with pressure feed systems, or in connection with fuel pumping devices such as electrically driven fuel pumps.

Still another feature of the invention relates to the provision of means for giving periodically corrected indications of the desired ratio, and at the same time for cumulatively metering the fuel, so that from time to time the accumulated amount of fuel delivered to the engine may be ascertained. In this connection, it is an object to secure both of the foregoing results within a single device of extremely simple form and construction and without the use of supplemental metering arrangements and simply by the use of additional connections to the metering devices themselves for giving the accumulated reading.

An object in connection with the foregoing is to provide means for indicating the accumulated reading at the dash board, and preferably within the same indicating instrument as is used for showing the periodically corrected ratio. In other words, the same indicating device will show both miles per gallon, for example, and accumulated gallons.

Another feature in connection with the accumulating devices is the provision of means for showing the amount of fuel in the storage tank, so that the driver will be at all times informed as to the amount of fuel still available besides being informed of the miles per gallon. In this connection, it is an object to provide an arrangement which will give a very accurate indication of amount of fuel in the tank by accurately metering the amount of fuel withdrawn therefrom. In this case, the accumulated reading of quantity is a negative value and causes a continuously reducing reading as the fuel is consumed.

A further feature in connection with the foregoing is the provision of means for increasing the indicated amount of fuel in the storage tank whenever fuel is introduced thereinto so as to again reset the indicated reading to the higher corrected figure, so as to at all times indicated the actual amount of fuel available. This resetting may be accomplished either manually or automatically as the fuel is delivered into the storage tank.

Another object of the invention is to provide automatic means for resetting the indicator to the higher figure as fuel is introduced into the tank, thereby eliminating error and uncertainty due to manual operations. In this connection, it is an object to secure the automatic resetting when desired by the use of an extremely simple metering device at the storage tank itself, which metering device is or may be connected to the dash board indicator.

It may also be said that another object is to provide a metering device for metering the fuel as it is delivered into the storage tank, which metering device, besides being of simple construction and accurate operation, may also be of small size and placed directly in the filler opening usually provided in fuel storage tanks of automotive vehicles. This metering device may, if desired, be considered as a separate and distinct unit usuable either in conjunction with the remaining mechanisms or independently thereof as desired.

Other objects and uses are to provide devices of extremely simple and rugged form and construction which can be easily made from die castings and sheet metal stampings with very few machine operations and at very low cost.

Other objects and uses of the invention will appear from a detailed description of the same, which consists in the features of construction and combinations of parts hereinafter described and claimed.

In the drawings:

Figure 1 shows a vertical section through an instrument embodying the features of the present invention showing the manner in which the same may be associated with the vacuum fuel feeding system of familiar form and construction. The particular fuel metering device illustrated in Fig. 1 is provided with a flexible cord connection to the indicator itself;

Fig. 2 shows a longitudinal section through a dash board indicator for use in conjunction with the device of Fig. 1;

Fig. 3 shows a side elevation of the cam slot tube of the indicator of Fig. 2;

Fig. 4 shows a face view of the indicator scale of the device of Fig. 2;

Figs. 5 and 6, respectively, show horizontal sections on the lines 5—5 and 6—6 of Fig. 1, looking in the direction of the arrows;

Fig. 7 shows a plan view of the device of Fig. 1;

Figs. 8 and 9 are horizontal sections through the device of Fig. 1, looking in the direction of the arrows;

Figs. 10 and 11 are fragmentary vertical sections through the device of Fig. 1, and looking in the directions of the arrows shown in Fig. 9;

Fig. 12 is a vertical section through a modified construction of device in which the indication of the desired ratio is given by the use of a rotary connection to the indicator as distinguished from a tension device of the arrangement of Fig. 1;

Fig. 13 shows a plan view of the device of Fig. 12;

Fig. 14 shows a horizontal section on the line 14—14 of Fig. 12, looking in the direction of the arrows;

Fig. 15 shows diagrammatically a system of connecting up devices such as those of Figs. 1 and 12, together with a vacuum fuel feed system for supplying the fuel which is metered through the device and against road travel, the road travel connection being effected to the speedometer drive shaft;

Fig. 16 shows a vertical section through another form of the device which is provided with supplemental connections for accurately metering the quantity of fuel fed to the engine;

Fig. 17 is a plan view of the device of Fig. 16, a portion of one of the gear ratchets being broken away;

Figs. 18 and 19 are horizontal sections on lines 18—18 and 19—19 of Fig. 16, looking in the direction of the arrows;

Fig. 20 is a fragmentary elevation of the back side of the lower portion of the device of Fig. 16;

Fig. 21 is a face view of a dash board indicator for use in connection with the device of Figs. 16, 17, 18 and 19 for showing both miles per gallon and gallons of gas in the storage tank;

Fig. 22 is a back view of the device of Fig. 21, the back cover plate being broken away and shown in section;

Fig. 23 is a vertical section on the lines 23—23 of Figs. 21, and 22, looking in the direction of the arrows;

Fig. 24 is a horizontal section on the lines 24—24 of Figs. 22 and 23, looking in the direction of the arrows;

Fig. 25 is a vertical section through a metering device for metering the fuel as it is supplied to the storage tank, said metering device being so constructed that it can be directly applied to the filler opening of the storage tank;

Fig. 26 is a plan view of the device of Fig. 25;

Figs. 27 and 28 are horizontal sections on the lines 27—27 and 28—28 of Fig. 25, looking in the direction of the arrows; and Fig. 29 shows diagrammatically a series of connections for use with the devices of Figs. 16 to 28, inclusive, together with the vacuum fuel feed system for supplying fuel to the engine through the metering device of the present invention, together with suitable connections between the metering device and the dash board indicator, together with a road travel connection from the speedometer drive shaft to the metering device of the present invention, and also shows diagrammatically a supplemental indicator for warning the driver when the miles per gallon falls below a certain predetermined point, and also shows an optional connection directly from the storage tank to the dash board indicator for automatically resetting the indication of quantity of fuel in the storage tank without special thought or effort on the part of the driver.

Referring first to the arrangement of Figs. 1 to 11, inclusive, I have shown the same in conjunction with a vacuum fuel feed tank 31 of familiar form. The same includes upper and lower float chambers 32 and 33, there being a float 34 in the upper chamber which operates the suction valve 35 and vent valve 36 through the medium of toggle levers 37 in the familiar manner. Fuel is supplied to this chamber through a connection 38 from the storage tank 39 at a convenient point. At the upper limit of movement of the float 34 the valves 35 and 36 are so operated as to cut off the suction from the pipe 40, which is in turn connected to the intake manifold 31 of the engine 42, and open the valve 36 so as to vent the upper chamber 32 and allow fuel to gravitate into the lower chamber 33 past a check valve 43. When the float 34 reaches its lower limit of movement the valves 35 and 36 are reversed, the vent being closed and the suction valve opened, so that a new charge of fuel may be drawn in to the chamber 32 through the pipe 38.

The above type of fuel feeding device is well known and understood in the art and is indicated herein merely by way of example of one form of device for supplying fuel to the engine. The features of the present invention may also be used in conjunction with many other forms of fuel feed. It will, however, be understood that the level of the fuel within the chamber 33 fluctuates up and down between certain upper and lower limits, and it is desirable that the metering device of the present invention be so arranged as to take care of this fact.

The device of the present invention includes one or more chambers 44 and 45 and 46 through which the fuel is metered in turn. Preferably there are three of the chambers, the same being conveniently established within a common casing 47. By this arrangement there is at all times one chamber completely filled, or being filled, another chamber connected to the fuel supply to the engine, and another chamber connected to the indicator to show the miles per gallon.

Adjacent to the lower ends of the chambers 44, 45 and 46 there is a common control valve 48, and the chambers are provided with ports 49, 50 and 51 leading to positions adjacent to the upper portion of this valve 48 at the plane of the section of Fig. 5.

At the plane of the section of Fig. 6, there is a passage 52 leading sidewise and connected with the fuel supply system by a line 53. Below the position of the valve 48 is a connection for a fuel delivery line 54 through which the fuel is delivered to the engine.

The valve 48 is provided with two segmental slots 55 and 56, as shown in Fig. 5, at the plane of the ports 49, 50 and 51, each of said slots spanning approximately 120° of arc. The other third of the valve is blanked off, as shown in Fig. 5. At the plane of Fig. 6, and in line with the connection 52 is a circular groove 57 completely encircling the valve and also in communication with the connection 52. This groove 57 connects with the slot 55 above it by a short passage 58 within the valve, so that fuel is also supplied to the slot 55, and from said slot 55 to whichever chamber is at the time connected thereto.

The other slot 56 connects by a passage 59 with the space directly below the valve and thence with the connection 54. Consequently, fuel is delivered from whichever chamber is at the time connected with the slot 56, through the passage 59 to the engine.

Preferably a light disk spring 60 is placed below the valve 48 so as to exert just sufficient upward pressure thereon to keep the valve properly seated but without binding. Said spring 60 when provided should be suitably ported, as shown in Fig. 1, to allow fuel to flow readily through it.

Reaching up through the center portion of the device and between the chambers 44, 45 and 46 is a passage 61. A valve stem 62 reaches through said passage having its lower end connected to the valve 48 and its upper end passing through a cover plate 63 within which it finds a bearing. On the top end of this valve stem is fastened a ratchet wheel 64 as by means of a cotter pin 65. This ratchet wheel preferably has a number of teeth equal to or a multiple of the number of chambers. In the present case there are nine teeth, three to each chamber.

Above the ratchet wheel is swingingly mounted an arm 66 on the bottom face of which is a pawl 67 which works on the ratchet wheel. A spring 68 draws the arm 66 back against a stop 69. A worm wheel 70 is journaled to the cover plate 63 on the stud 71, said worm wheel having one or more stops 72 projecting above its top surface and adapted to engage the back face of a flange 73 which reaches down from one edge of the arm 66. The worm wheel 70 is driven by a worm 74 from a road travel connection 75ª, so that said worm wheel makes one revolution for each unit of road travel or multiple thereof.

The road travel connection 75ª may be driven in any suitable manner, as, for example, by a side reach from the speedometer drive shaft 76 driven off of the front wheel 77 by the use of a T connector 78, as shown in Fig. 15. Or the road travel connection 75ª may be driven in any suitable manner, as, for example, by a special drive shaft to one of the road wheels or to the vehicle propeller shaft. In other cases, it will be driven in proportion to the amount of work performed, as, for example, in proportion to the number of revolutions of the engine, or the distance traversed by an aeroplane or motor boat or locomotive. The main point is that this connection is in proportion to the work performed.

Each time the stop 72 comes behind the flange 73 (rotation being in the direction of the arrow of Fig. 8), it picks up the arm 66 and swings it against the spring 68. After somewhat greater than one half revolution of the wheel 70 the stop 72 will ride from behind the flange 73 and allow the arm 66 to be drawn back suddenly by the spring. The pawl 67, which has in the meantime engaged a new ratchet tooth, will turn the ratchet wheel 64 and, therefore, the valve, the distance of one tooth. Upon the completion of three such corrections, the valve will have been brought to such a position as to insure a regrouping of the chambers 44, 45 and 46.

The cover plate 63 effectually seals the upper ends of all of the chambers, but reaching up from said cover plate are the vent tubes 74ª, 75 and 76ª indicated in Figs. 1, 7 and 8 in particular. These may be established in any convenient manner. For example, in the arrangement of Figs. 1 to 11 each vent tube is a thin copper tube having its lower end flanged and locked in place by a nut 77.

All of the vent tubes reach to or above the highest level of liquid supplied to the device. For example, said tubes should reach slightly above the highest level which the liquid will probably assume within the lower tank 33 of the vacuum feed system indicated.

The upper ends of all of the vent tubes are turned over into a horizontal position and brought to a common point where they connect to a Y 78ª, best shown in Figs. 1 and 7. This Y preferably comprises upper and lower sheet metal stampings which when drawn together by nuts 79 firmly connect to the ends of all of the vent tubes and to a common tube 80. A vent opening 81 is provided in the Y, as shown in Fig. 7.

Within the chambers 44, 45 and 46 are the floats 82, 83 and 84, respectively, each of said floats being of substantial size but relatively shallow. If desired, the float in each chamber may be guided by a pair of vertical wires or rods 85 and 86 socketed in the lower ends of the chambers and in the cover plate. The floats may be made of any convenient form and material. For example, if of cork they are preferably effectually shellacked or otherwise protected against water logging with fuel. Preferably also in such case the holes for the guide rods 85 and 86 should be lined, as indicated in Fig. 9.

To the upper ends of these floats there are connected the cords 87, 88 and 89, respectively, all of said cords reaching up through their respective vent tubes and over into the Y 78 and beyond into the common tube 80, where they are connected to a common eye 90. These cords are all of such length that when all of the floats are at the top of their chambers the eye 90 may be drawn over its full distance and the slack taken out of all of the cords. When any float moves down in its chamber the eye will be drawn over a proportional amount, and the lowest float will at all times dictate the position of the eye. A cord 91 is connected to the eye and leads through a tube 80 to the dash board indicator.

These cords, when used, may be of any suitable material such as silk fish line or the like, and they are preferably light and strong and of such material that they will not appreciably shrink or change their length with repeated wetting in the fuel.

The dash board indicator is shown in detail in Figs. 2, 3 and 4. It includes a stationary tube 92 the front end of which is flanged, as shown at 93, and secured to the back face of a housing 94 which in turn is flanged, as shown at 95, and receives the front cover of glass 96. On the front face of the housing 94 is the scale 97, and a needle 98 is arranged to move over said scale, as shown in Fig. 4.

Said needle reaches through the housing and is connected to a section of tubing 99, the rear end of which is journaled at the rear end of the stationary tube 92 as by means of a small ball bearing 100, so that the tube 99 can turn easily. Said tube 99 is provided with a straight slot 101 and the stationary tube 92 is provided with a curved slot 102. A cross pin 103 works through both slots and is connected to the cord 91 already referred to. A spring 104 within the tube 99 tends to force the pin 103 forward so as to keep the cord 91 always under tension. This spring is, however, light enough, so that it does not appreciably modify the positions of the floats, and also as each float descends the lowest float will draw the pin 103 back, moving the spring accordingly.

By properly shaping the slots 101 and 102 with respect to each other, the scale marks, 97, may be made uniform throughout the normal working range of the device. Furthermore, the front and back ends of said slots may be set at such positions that the needle is not operated either for readings higher than the highest normal reading or below the lowest normal reading. When this arrangement is used the floats may descend a certain distance in their respective chambers without moving the needle back from the highest scale reading. As the floats work within the central portions of their respective chambers, the needle will move back and forth to corrected positions correspondingly thereto; but if the fuel in any chamber should move below the lowest normal amount of fuel consumption for a unit distance of road travel, its float would simply remain suspended by its cord, the needle remaining at the lowest point on its scale.

It will be seen that this arrangement will give a corrected reading each time a new grouping of chambers takes place, and that each chamber is initially entirely full of fuel; that at the next grouping it is connected to the engine and supplies fuel thereto for a unit distance of road travel; and that at the next grouping it is sealed, and its float, being the lowest one of the series, will dictate the reading of the indicator needle. It will also be seen that this reading will remain unchanged until the next grouping of chambers takes place, or until the next float of the series moves to a lower position and assumes control of the needle. At the next grouping of chambers the float previously controlling the needle will rise to the top of its chamber as the chamber is filled and the corrected reading will remain on the indicator until a new grouping takes place or until the next float moves to an even lower position.

If desired, suitable pulleys or rollers may be provided for the cords at the points where they pass around the bends in the tubes, but ordinarily it will be found unnecessary to use the same.

At a point directly between the fuel supply and delivery pipes 53 and 54 is a valve 105, best shown in Fig. 1. Said valve is normally closed in the position indicated in Fig. 1, but when turned through a sufficient angle establishes a direct connection between the fuel supply and delivery pipes, thus ensuring a continuous supply of fuel to the engine irrespective of any operation of the metering device itself. This valve may be connected to the dash board by a line 106, as shrown in Fig. 15, and may thus be controlled by the driver. If desired, it may be automatically operated to ensure automatic opening of the valve whenever any one of the floats falls below a predetermined low point. Such an arrangement will be explained hereinafter.

If desired, the valve 48 may be lubricated, as by the use of castor oil placed in the passage 61 and fed to the surfaces of said valve by passages 107ᵃ in the valve itself leading to the wearing surfaces of the valve. Ordinarily, no such lubrication will be needed, since the valve is moved very slowly and only makes a fraction of a revolution per mile of road travel. For example, when the parts are so geared that the arm 66 makes one swing for each eight hundred eighty feet of road travel, there will be a regrouping of chambers every half mile representing one third revolution of the valve. This would mean a complete rotation of the valve every one and one half mile.

Referring to the construction shown in Figs. 12, 13 and 14, in this case the floats 82, 83 and 84 are mounted so that they can slide vertically on corresponding central spindles 107, 108 and 109 respectively. Each spindle has its lower end working easily in a step bearing 110 at the lower end of its chamber. The upper portions of the spindles are connected to small rods 111, 112 and 113 leading up through the corresponding vent tubes and provided with bearings 114 at their upper ends. These rods have their upper ends turned over at right angles into fingers 115, 116 and 117.

Each of the spindles is provided with a curved slot 118 and the corresponding float has a cross pin 119 reaching through said slot and having its outer end working in a vertical guide groove 120 in the outer wall of the chamber. Consequently, as each float rises and falls it turns its spindle first in one direction and then in the other.

A pair of Y shaped brackets 121 and 122 are supported by the upper ends of the vent tubes, and a central stem 123 is journaled at the centers of these brackets. A gear wheel 124 is connected to said stem above the bracket 121, and gear wheels 125, 126 and 127 are journaled on the upper portions of the vent tubes and mesh with the common center gear wheel 124. Consequently, all four of the gears turn back and forth as a common train.

Studs 128, 129 and 130 project upwardly from the gear wheels 125, 126 and 127, respectively, in position to be engaged by the fingers 115, 116 and 117 as they come around, and a spring 131 connected to the stem 123 and bracket 122 tends to turn the central gear 124, and consequently the entrained gears 125, 126 and 127 to such positions as to carry all of the studs 128, 129 and 130 around to points farthest removed from the central gear 124.

All of the fingers 115, 116 and 117 are so positioned that when all of the floats are at the top of their respective chambers, said fingers all point outwardly (see finger 116 of Fig. 13) and all of the studs may then rest against said fingers, the gears 125, 126 and 127 standing in the proper positions to bring the studs against the fingers. The lowering of any float will consequently cause its finger to press against the corresponding stud and turn the gear train and stem 123 against the spring 131, and the amount of such turning will depend upon the lowering of the float. Whichever float is the lowest will determine the amount of movement of the gear train and stem against the spring 131, and if a successive float is not as low as a preceding one, the spring will be allowed to move the gear train back until the corresponding stud comes into actual contact with the finger of such higher float. Thereupon the gear train will be arrested and a new reading indicated.

The position of the stem 123 is therefore an indication of the position of the controlling float and, therefore, determines the reading of the instrument in miles per gallon.

The indication at the dash board can be given in any convenient manner as by the means of a shaft 132 and spiral gears 133. It should be noted that in the present instance the vent tubes should stand high enough to prevent any overflowing of fuel. Furthermore, by proper shaping of the slots 118 or the spiral gears 133 or both, it is possible to insure a uniformly graduated scale throughout the normal range of readings.

Referring to the construction in Figs. 16, 17, 18 and 19, in this case, I have made provision not only for giving the indication of ratio, but have also provided for cumulatively metering the quantity of fuel fed through the device. In this connection, it will be understood that the up and down movements of the various floats serve in themselves to indicate the quantity of fuel actually passed through the device. By making the slots 134 of uniform taper or spiral, the shaft stems 135, 136 and 137 will be rotated back and forth in direct proportion to the vertical movements of the floats, and said rotations will, therefore, be a measure of the quantity of fuel metered through the device.

In the present instance, I establish a gear train including the gears 138, 139 and 140 corresponding to the stems 135, 136 and 137, respectively, said gears meshing with a central gear 141. Each of the stems 135, 136 and 137 has secured to its upper end a clutch block 142 working within an opening in the corresponding gear, said clutch block being recessed at one point, as shown at 143, and a spring pressed clutch ball 144 being placed in said recess. The arrangement is such that on one vertical movement of the float the corresponding gear 138, 139 or 140 will be hitched around a distance proportional to the vertical movement of the float, and, therefore, proportional to the quantity of fuel metered. Preferably this metering action is performed on the up stroke of each float. This is desirable since on the down stroke the float is either called upon to turn the other gear train or to retain the same in a certain position, so by performing the metering action on the up stroke the work of the floats is divided and is not all imposed on one vertical movement.

In connection with the foregoing, it will be understood that in the construction of Figs. 16, 17, 18 and 19 I have provided a set of gear trains for giving the indication of the ratio, the same being similar to that illustrated in Figs. 12, 13 and 14.

As a matter of convenience in construction, the gear 141 may be provided with a small stem 145 reaching downwardly through a sleeve 146 which in turn reaches downwardly from the central gear 124 of the ratio train. A worm 147 on the lower end of the stem 145 meshes with a worm gear 148 on a shaft 149 for cumulating mechanism, and a spiral gear 150 on the sleeve 146 meshes with another spiral gear 151 on the shaft 152 for the ratio indicating mechanism. These two shafts are conveniently journaled in front and rear brackets 153 and 154, respectively, which are mounted on the upper portions of the vent tubes, as indicated in Fig. 19.

Furthermore, the various gear trains are conveniently supported by a pair of circular plates 155 and 156, the plate 155 being in turn supported by the upper portions of the vent tubes, and the plate 156 by a series of posts 157 reaching upwards from the plate 155.

Inasmuch as the position of the shaft 152 depends upon the ratio, said shaft may be conveniently connected to the valve 105 at the lower end of the structure for establishing direct communication past the metering device to allow for continuous and uninterrupted feed of fuel in case the metering device should fail to function, or if for any reason the ratio should fall abnormally low.

I have, therefore, illustrated in Fig. 20 a finger 158 on the stem of the valve 105, together with a spring 159 which tends to turn the valve into the open position. Such opening movement is normally resisted by a bell crank 160 pivoted at the point 161 and having a shoulder 162 on one arm against which the finger 158 normally engages. The shaft 152 has a crank 163 on its back end which operates a rod 164 reaching down through an opening in the other arm of the bell crank 160 and having an adjustable stop 165 which will engage said arm of the bell crank when the rod 164 is forced down abnormally low. Such abnormal movement will only take place when the ratio falls below a predetermined amount, as, for example, when a float approaches within one inch of the bottom of its chamber. Thereupon the bell crank will be rocked, the finger 158 disengaged, and the valve will be snapped open and will remain in such position indefinitely until restored by the driver. The driver may adjust the position of the stop 165 so that such "cutting out" action will occur at any desired lower limit of ratio reading.

Said valve may be operated by the rod 106 from the dash board, as indicated in Fig. 29, so that the operator can restore the valve to the closed position when he desires to do so.

If desired, a signal device may be operated by the opening of the valve 105 so as to give either a visible or audible signal to the driver. For example, a contact electric point 167, is indicated in Fig. 20, in position to be engaged by the finger 158 after the valve is opened, thus closing an electric circuit including the battery 168 and lamp 169 on the dash board. This lamp will remain illuminated as long as the valve is in the open position so as to give a visible signal until the operator again closes the valve. It will be noted that I have provided means for giving a signal to the driver when the ratio falls below a certain predetermined amount; or means for advising the driver of the fact that the metering device has been automatically cut out of service. If desired, the lamp 169 may be incorporated directly with the indicator on the dash board, as shown at the upper portion of the instrument illustrated in Fig. 21. In such case the lamp is preferably of some distinctive color such as red or green.

Referring to Figs. 21, 22, 23 and 24, I have therein illustrated a convenient form of dash board instrument for giving the indications of miles per gallon or the cumulative readings of amount of fuel metered, or both indications as desired. The instrument illustrated gives both indications and constitutes a very convenient and desirable type of device. For this purpose, said instrument includes a face plate 170 having a flange 171 around its border, said flange retaining a glass cover 172 in position against a spacer 173.

This face plate is provided with a curved slotted opening 174 formed about a center 175, and behind this slotted opening is a curved sheet 176 which is spaced backwardly a sufficient distance to accommodate a swinging needle 177. Said needle is carried by a stem 178 journaled between the face plate 170 and a bracket 179, as shown in Figs. 22 and 23.

A segmental gear 180 is secured to the stem 178 and meshes with another segmental gear 181 which is journaled between the back of the plate 176 and a bracket 182. The gear 181 is carried by a stem 183 which projects through the bracket 182 and may be connected to a suitable shaft such as a section of piano wire 184 by means of a coupling 185. The shaft 184 is connected to the shaft 152 by means of a coupling 186, as shown in Fig. 19. Consequently, the position of the shaft 152 dictates the position of the needle 177.

The front face of the plate 176 is suitably marked, as indicated in Fig. 21, to designate the desired ratio such as miles per gallon. By properly shaping the segmental gears 180 and 181 the scale 187 may be eestablished with uniform graduations throughout its normal working range, as, for example, between the amounts of 8 and 24 miles per gallon. Such an arrangement is indicated in the figures. Furthermore, by properly shaping these gears it is possible to allow for practically a complete revolution of the shaft 152 and its companion shaft 184, while only causing a swing of the needle through 90° or 120° of arc. This is a desirable arrangement and will result in greater accuracy of reading.

At another point in the face plate 170 is an opening 188 behind which is a drum 189 having its shaft journaled in upper and lower brackets 190 and 191 which are secured to the back of the face plate 170. This drum is provided with markings about its periphery, as shown in the different figures, which are visible through the opening 188 and designate gallons in the storage tank. Preferably these markings occupy the greater portion of a complete revolution.

Alongside of the drum is a vertical stem 192 the upper end of which carries a disk 193. Said stem is journaled in the bracket 190 on the back of the face plate 170. The stem also carries a friction roller 195 which is adapted to engage the upper portion of the drum so as to turn the same by friction.

Extending in a horizontal direction above the disk 193 is a shaft 196 which is journaled between the face plate and an arm 197 of the bracket 192. Said shaft carries a friction wheel 198 which engages the disk 193 near its forward edge so as to rotate the stem 192 and thus the drum. The shaft 196 is connected by a coupling 199 with another shaft 200 of piano wire or the like. This shaft 200 is in turn connected by a coupling 201 with the shaft 149 which is turned cumulatively with the consumption of fuel.

The stem 192 preferably reaches down through the instrument casing 202 and has a thumb piece 203 on its lower end by which it can be manipulated by the driver, as is clearly evident from Figs. 21 and 23. Said stem is normally raised by a spring 204 so as to retain the disk 193 in engagement with the friction wheel 198, but by pulling down slightly on the thumb piece 203 the driver is able to disengage the disk 193 from the friction wheel so as to turn the stem 192 and thus the drum 189 to reset the same.

The parts are so arranged that as fuel is consumed the drum 189 turns backwardly so as to read consecutively lower amounts. When a new supply of fuel is placed in the storage tank, the driver should reset the drum 189 to a correspondingly higher reading. For example, if said drum reads six and ten gallons are placed in the tank, he should then reset the indicator to read sixteen, this being the amount of fuel then available.

By using flexible shafts 184 and 200 of such material as piano wire or phosphor bronze wire, provision is made for a non-alignment of the parts, while at the same time a definite positive connection is established. If desired, a tubular section 205 may be extended between the bracket 153 (see Fig. 19) and the back of the casing 202 (see Figs. 22 and 24). This will establish a definite rigid connection between the metering and indicating devices and at the same time protect the flexible shafts 184 and 200.

It will be noted that in the arrangement thus far described the resetting of the cumulative indicator is manual. If for any reason the device should not be reset when a new supply of fuel is taken on, it will read a lower amount than is actually available.

In order to prevent the drum 189 from turning backwardly beyond the zero reading position, I have provided a pin 206 on said drum which will come into engagement with the lug 207 on the bracket 191 at the proper time, as shown in Figs. 22 and 23.

If desired means may be provided for automatically resetting the drum reading when a new supply of fuel is taken on. For this purpose, I have provided a metering device which is illustrated in detail in Figs. 25, 26, 27 and 28. The same is conveniently threaded into the filler opening 208 of the storage tank 209. Said metering device includes a casing comprising upper and lower sections 210 and 211, the upper section preferably having a spout 212 reaching upwardly at an angle and into which the fuel hose may be inserted in the well understood manner. The upper end of this spout may be internally threaded, as shown at 213, to receive a cap.

Extending around the upper section 210 is an annular passage 214 into which the fuel is initially delivered, said passage being open around the entire periphery of the device with the exception of a short section immediately beneath the filler spout 212 which is closed by a short partition 215 (see Fig. 25). This will ensure a distribution of the fuel around the major portion of the passage.

The lower section 211 is provided with a series of curved vanes 216 which reach towards the center of the device and give the fuel a rotary motion as it is discharged towards the center of the device.

The lower section 211 is provided with a downwardly depending neck 217 which can be threaded into the filler opening 208, as indicated in Fig. 25. A series of radial arms 218 in the neck 217 carry a central member 219 within which is threaded a stem 220 which can be locked by a lock nut 221.

A reaction turbine 222* is mounted centrally within the device and is supported by a step ball bearing 223 on the upper end of the stud 220. A stem 222 reaches upwardly from the turbine and is secured by a pin bearing 225 reaching down through a cover plate 226. A worm and gear connection 227 is established from the stem 222 to a horizontal shaft 228 reaching out sidewise from the upper section 210.

A circular metal disk 229 of aluminum or brass is carried by the stem 222, and a magnet 230 embraces the edge portion of this disk so that a drag is created on the disk as it rotates. The magnet 230 may be mounted on a pin 231 by which its position can be adjusted in order to regulate the amount of this drag.

The reaction turbine has its blades 232 facing in the proper direction to receive the liquid discharge thereagainst so as to rotate the turbine by a reaction effect.

Upon delivering a supply of fuel through the neck 212, the same is distributed more or less around the passage 214 and rushes down through the lower section 211 where it is deflected by the vanes 216 against the vanes 232 of the reaction turbine. The turbine is thus rotated, but the drag created by the permanent magnet will prevent overrunning of the turbine after the flow of liquid ceases. The number of revolutions of the turbine will depend directly upon the volume of liquid delivered through it and this is true practically irrespective of the momentary rate of flow within practical limits.

From the above it appears that the shaft 228 will be rotated in direct proportion to the volume of liquid introduced into the tank. This shaft may be connected by a section of piano wire or other suitable shafting 233 and a coupling 234 (see Fig. 24) with a shaft 235 in the dash board instrument carrying a friction wheel 236. A stem 237 is journaled in the bracket 194 and has a friction disk 238 at its upper end. The wheel 236 drives the disk 238. Another friction wheel 239 is mounted on the stem 237 at a proper position to engage the drum 189 when the stem 237 is swung over a slight amount. The lower portion of the stem 237 is journaled in the bracket 191 by a slotted opening (the stem 192 also being journaled by a slotted opening); and a link 240 connects together the lower portions of both of the stems 192 and 237. A spring 241 normally moves the link 240 over into the position of Fig. 22 so as to keep the friction wheel 95 against the drum 189, but said spring is relatively light, so that a comparatively small pressure will throw the link over to the left and reverse the action, carrying the friction wheel 195 away from and the friction wheel 239 against the drum 189.

For the above purpose, a collar 242 is mounted on the lower portion of the stem 237 with a frictional engagement, said collar having a finger 243 adapted to engage a stationary bracket 244. When the stem 237 first commences to turn (upon the introduction of a new supply of fuel into the tank), the collar 242 twists around and causes a reaction between the finger 243 and the bracket 244 which carries the stem 237 over and throws its friction wheel 239 against the drum (simultaneously moving the friction wheel 195 from the drum). The introduction of a new supply will thus cause the drum to be properly rotated to a new position where it indicates the amount of fuel actually in the tank. The spring 241 will reengage the friction wheel with the drum as soon as the introduction of new fuel supply ceases.

It will be understood that although I have illustrated the indicating device itself as provided with the supplemental stem 237, friction wheel 239, disk 238, shaft 235, friction wheel 236 and link 240, etc., nevertheless the same are not needed to the proper operation of the indicating device for showing quantity of fuel in the tank when the device is used for resetting by hand operation.

It will also be understood that the metering device shown in Figs. 25, 26, 27 and 28 may be used entirely independently of any mechanism for showing miles per gallon or any other ratio, and said metering device may also be used either in conjunction with a dash board indicator, or as a separate self contained unit. For example, a suitable counting device may be placed at the position of the meter itself so as to accumulate the volume of liquid introduced through it, in which case it will serve to maintain a permanent registration of the total amount of fuel introduced into the tank. Furthermore, the metering device disclosed herein and illustrated in Figs. 25 to 28 inclusive herein is the subject of a copending application for Letters Patent of the United States, Serial No. 64,557, filed October 24, 1925, and therefore I do not claim the same herein per se, but make such claim in such other application.

I wish to point out the fact that although I have herein illustrated and described a metering device as used in conjunction with a specific type of vacuum fuel feed, still I do not intend to limit myself to this particular fuel feed nor any other, except as I may do so in the claims. For example, the device may be used in connection with other forms of vacuum fuel feed, as well as the feeding of fuel directly by gravity, pressure, or such pumping devices as electrically driven pumps. In the case of fuel supplied either by pressure or by special pumping devices, it may be desirable to use a float chamber in advance of the metering device itself so as to establish a suply of fuel at the desired elevation, so that it can run by gravity to the present metering device. The system of feeding fuel herein disclosed, considered as a system is the subject-matter of another and co-pending application for Letters Patent of the United States, and therefore I do not claim the same herein as a system, but include such claims in said divisional application.

It will be noted that the present application discloses an arrangement wherein there is provided a fuel chamber of definite or known capacity having a vent tube in its roof reaching upwards a sufficient height to balance the normal pressure of fuel delivered to the device by the fuel supply means so that the fuel will not overflow therefrom, and that there is provided a fuel supply connection for delivering fuel to this chamber and also a fuel delivery connection leading from said chamber to the carburetter of the engine, together with valve means whereby the delivery of fuel to the engine may be exclusively from said chamber until the chamber is completely emptied, whereby it is possible to ascertain the engine performance by ascertaining the distance travelled on such known amount of fuel, either automatically by means of a definite indicator or by calculations based on the measured mileage travelled on said known amount of fuel. Inasmuch as the general arrangement of such device constitutes the subject-matter of a divisional application for Letters Patent, I do not claim the same herein specifically, but do so in such divisional application.

While I have herein shown and described only certain embodiments of the features of my present invention, still I do not intend to limit myself to the same, except as I may do so in the claims.

I claim:

1. In a motor vehicle having a carburetor and a vacuum fuel feed system located at a higher level than the carburetor and adapted to feed fuel thereto, the level of fuel in the vacuum feeding system being variable, means interposed between the vacuum fuel feeding system and the carburetor for metering the fuel in comparison to road travel, said means including a plurality of closed chambers of substantially equal size having their roofs located below the normal low level of liquid in the vacuum feeding system and having independent vent tubes reaching upwardly from said roofs to a higher elevation than the normal high liquid level of the vacuum feeding system, a valve adjacent to the lower ends of all of said chambers and adapted to control them all, means for advancing said valve substantially in proportion to road travel of the vehicle, a fuel supply connection from the vacuum feeding system to said valve, a fuel delivery connection from said valve to the carburetor, passages in the valve operable to successively connect each chamber to the fuel supply connection, then to the fuel delivery connection, and then to seal the chamber, a float within each chamber controlled by the level of fuel therein, an indicator including a movable element, connections reaching from the respective floats through the respective vent tubes to the exterior of the chambers, and means in conjunction with said connections operable to move said element, to the position dictated by the lowermost float, substantially as described.

2. In a motor vehicle having a carburetor and means for supplying fuel thereto from a position of variable elevation higher than the carburetor, means interposed between said supply means and the carburetor for metering the fuel in comparison to road travel, said metering means including a plurality of closed chambers of substantially equal size having their roofs located below the normal low level of liquid in the supply means, and having independent vent tubes reaching upwardly from said roofs to a higher elevation than the normal high liquid level of the feeding means, a valve adjacent to the lower ends of said chambers and adapted to control them all, means for advancing said valve substantially in proportion to road travel of the vehicle, a fuel supply connection from the supply means to said valve, a fuel delivery connection from said valve to the carburetor, passages in the valve operable to successively connect each chamber to the fuel supply connection, then to the fuel delivery connection, and then to seal the chamber, a float within each chamber controlled by the level of fuel therein, an indicator, and connections from the floats to the indicator operable to cause said indicator to read according to the position of the lowermost float, substantially as described.

3. In a motor vehicle having a carburetor and means for supplying fuel thereto from a position of variable elevation higher than the carburetor, means interposed between said supply means and the carburetor for metering the fuel in comparison to road travel, said metering means including a plurality of closed chambers of substantially equal size having their roofs located below the normal low level of liquid in the supply means, and having independent vent tubes reaching upwardly from said roofs to a higher elevation than the normal high liquid level of the feeding means, a valve adjacent to the lower ends of said chambers and adapted to control them all, means for advancing said valve substantially in proportion to road travel of the vehicle, a fuel supply connection from the supply means to said valve, a fuel delivery connection from said valve to the carburetor, passages in the valve operable to successively connect each chamber to the fuel supply connection, then to the fuel delivery connection, and then to seal the chamber, an indicator, and connections between the chambers and the indicator operable to cause said indicator to read according to the position of the lowermost level of liquid in the chambers, substantially as described.

4. In a motor vehicle having a carburetor and means for feeding the fuel therefor, means interposed between the fuel feeding means and the carburetor for metering the fuel in comparison to road travel, said metering means including a plurality of closed chambers of substantially equal size having independent vent tubes reaching upwardly from their roofs to a sufficient elevation to balance the pressure of fuel supplied in them, a valve adjacent to the lower ends of said chambers and adapted to control them all, means for advancing said valve substantially in proportion to road travel of the vehicle, a fuel supply connection from the feeding means to said valve, a fuel delivery connection from said valve to the carburetor, passages in the valve operable to successively connect each chamber to the fuel supply connection, then to the fuel delivery connection, and then to seal the chamber, an indicator, and connections from the interiors of the chambers reaching through the respective vent tubes to the indicator operable to cause said indicator to read according to the level of liquid in the controlling chamber, substantially as described.

5. In a motor vehicle having a carburetor and means for supplying fuel therefor, a metering chamber, a vent tube reaching upwardly from its roof to a sufficient elevation to balance the normal pressure of fuel delivered to the chamber, a valve for controlling said chamber, a connection for the supply of fuel to said valve, a connection for the delivery of fuel from the valve to the carburetor, passages in the valve operable to successively connect the chamber to the fuel supply connection, then to the fuel delivery connection, and then to seal the chamber, a float within the chamber controlled by the level of fuel therein, an indicator, and connections from the float to the indicator extending through the vent tube and operable to cause the indicator to assume a position corresponding to the level of fuel in the chamber, substantially as described.

6. In a motor vehicle having a carburetor and means for supplying fuel therefor, a metering chamber, a vent tube reaching upwardly from its roof to a sufficient elevation to balance the normal pressure of fuel delivered to the chamber, a valve for controlling said chamber, a connection for the supply of fuel to said valve, a connection for the delivery of fuel from the valve to the carburetor, passages in the valve operable to successively connect the chamber to the fuel supply connection, then to the fuel delivery connection, and then to seal the chamber, and means extending from the interior of the chamber through the vent tube to the indicator operable to cause the indicator to assume a position depending upon the elevation of fuel in the chamber, substantially as described.

7. In a motor vehicle having a carburetor and means for supplying fuel therefor, a metering chamber, a valve for controlling the same, a connection for the supply of fuel to said valve, a connection for the delivery of fuel from the valve to the carburetor, means for advancing the valve substantially in proportion to road travel of the vehicle, passages in the valve operable to successively connect the chamber to the fuel supply connection, then to the fuel delivery connection, and then to seal the chamber, an indicator, and mechanical connections between the interior of the chamber and the indicator operable to cause the indicator to assume a position depending upon the elevation of fuel within the chamber, substantially as described.

8. In a motor vehicle having a carburetor and means for supplying fuel therefor, means interposed between the fuel supply means and the carburetor for metering the fuel in comparison to road travel, said means including a plurality of chambers of substantially equal size, a valve for controlling all of said chambers, means for advancing said valve substantially in proportion to road travel of the vehicle, a fuel supply connection for supplying fuel to said valve, a fuel delivery connection for the delivery of fuel from the valve to the carburetor, passages in the valve operable to successively connect each chamber to the fuel supply connection, then to the fuel delivery connection and then to seal the chamber, an indicator, and mechanical means extending between the interiors of the chambers and indicator operable to cause the indicator to assume a position dictated by the lowermost level of fuel in the chamber, substantially as described.

9. A device of the class described comprising in combination a series of chambers of substantially equal size, all of said chambers having roofs and vent tubes reaching upwards from said roofs, a valve adjacent to the lower portions of said chambers and adapted to control them all, means for advancing said valve substantially in proportion to road travel of the vehicle, a fuel supply connection to said valve, a fuel delivery connection from said valve, passages in the valve operable to successively connect each chamber to the fuel supply connection, then to the fuel delivery connection, and then to seal the chamber, a float within each chamber controlled by the level of fuel therein, a movable element exterior to the device, and connections from all of the floats extending through the respective vent tubes to said movable element operable to move said element to a position dictated by the lowermost float, substantially as described.

10. A device of the class described comprising in combination a series of chambers of substantially equal size, a valve adjacent to the lower portions of said chambers and adapted to control them all, means for advancing said valve substantially in proportion to road travel of the vehicle, a fuel supply connection to said valve, a fuel delivery connection from said valve, passages in the valve operable to successively connect each chamber to the fuel supply connection, then to the fuel delivery connection and then to seal the chamber, a float within each chamber controlled by the level of fuel therein, a movable element exterior to the device, and mechanical connections from all of the floats reaching to the movable element and operable to bring said element to a position dictated by the lowermost float, substantially as described.

11. A device of the class described comprising in combination a chamber, a valve for controlling said chamber, means for advancing said valve substantially in proportion to road travel of the vehicle, a fuel supply connection to said valve, a fuel delivery connection from said valve, passages in the valve operable to successively connect the chamber to the fuel supply connection, then to the fuel delivery connection and then to seal the chamber, a float within the chamber controlled by the level of fuel therein, a movable element exterior to the device, and mechanical connections between the float and the movable element operable to move said element in accordance with the movements of the float, substantially as described.

12. In a motor vehicle having a carburetor and means for feeding fuel therefor, means interposed between the fuel feeding means and the carburetor for metering the fuel in comparison to road travel, said metering means including a closed chamber, a valve for controlling the same, means for advancing said valve substantially in proportion to road travel of the vehicle, a fuel supply connection from the feeding means to said valve, a fuel delivery connection from the valve to the carburetor, passages in the valve operable to successively connect the chamber to the fuel supply connection then to the fuel delivery connection and then to seal the chamber, a float within the chamber controlled by the level of fuel therein, a movable element, connections from the float to the movable element operable to cause said element to assume a position depending upon the float, a shunt valve intermediate between the fuel supply and fuel delivery connections, means normally tending to move said valve to open position, means for locking said valve in the closed position, and connections between the movable element and said locking means effective to unlock the same when the float moves below a predetermined position, substantially as described.

13. In a motor vehicle having a carburetor and means for feeding fuel therefor, means interposed between the fuel feeding means and the carburetor for metering the fuel in comparison to road travel, said metering means including a closed chamber, a valve for controlling the same, means for advancing said valve substantially in proportion to road travel of the vehicle, a fuel supply connection from the feeding means to said valve, a fuel delivery connection from the valve to the carburetor, passages in the valve operable to successively connect the chamber to the fuel supply connection, then to the fuel delivery connection, and then to seal the chamber, a float within the chamber controlled by the level of fuel therein, a movable element, connections from the float to the movable element operable to cause said element to assume a position depending upon the float, a shunt valve intermediate between the fuel supply and fuel delivery connections, and connections between the movable element and said shunt valve effective to insure opening of the valve when the float moves below a predetermined position, substantially as described.

14. In a motor vehicle having a carburetor and means for feeding fuel therefor, means interposed between the fuel feeding means and the carburetor for metering the fuel in comparison to road travel, said metering means including a plurality of closed chambers of substantially equal size, means for successively completely filling each chamber with fuel, then connecting the carburetor exclusively to said chamber to insure delivery of fuel solely from said chamber, then sealing the chamber after a predetermined distance of road travel, floats in the chambers, an indicator, and means operable to cause said indicator to indicate at all times in accordance with the position of the lowest float, substantially as described.

15. In a motor vehicle having a carburetor and means for feeding fuel therefor, means interposed between the fuel feeding means and the carburetor for metering the fuel in comparison to road travel, said metering means including a chamber, means for first completely filling said chamber with the fuel, thereafter insuring delivery of fuel to the carburetor exclusively from said chamber for a predetermined distance of road travel, thereafter sealing said chamber, a float in the chamber, an indicator, and means for causing said indicator to indicate according to the position of the float, substantially as described.

16. A metering device for the purpose specified comprising in combination a series of chambers of substantially uniform cross section throughout their height, a valve for controlling all of said chambers, a fuel supply connection to the valve, a fuel delivery connection from the valve, means for advancing the valve in proportion to one variable, passages in the valve operable effectively to fill each chamber from the fuel supply connection, then connect such chamber to the fuel delivery connection, and then to seal such chamber, floats in the respective chambers, an indicator, and common means connecting the floats and indicator operable effectively to cause the indicator to indicate at all times in accordance with the position of the lowest float, and including co-operating gears of variable ratio effectively to insure uniform amounts of movement of the indicator corresponding to uniform changes of ratio of said variable compared to fuel throughout the working range of the device, substantially as described.

17. A metering device for the purpose specified comprising in combination a series of chambers of substantially uniform cross section throughout their height, a valve for controlling all of said chambers, a fuel supply connection to the valve, a fuel delivery connection from the valve, means for advancing the valve in proportion to one variable, passages in the valve operable effectively to fill each chamber from the fuel supply connection, then connect such chamber to the fuel delivery connection, and then to seal such chamber, floats in the respective chambers, an indicator, and mechanical means intermediate between the floats and indicator operable effectively to cause the indicator to indicate at all times in accordance with the position of the lowermost float and including means operable effectively to insure uniform amounts of movement of the indicator corresponding to uniform changes of ratio of said variable compared to fuel throughout the normal working range of the device, substantially as described.

18. In a device of the class described, the combination of a series of chambers for fuel located around a common vertical axis, a common valve for said chambers located adjacent to their lower ends, connections from the chambers to said valve, a fuel supply connection to the valve, a fuel delivery connection from the valve, a float in each chamber, vent tubes extending vertically from the roofs of the chambers to an elevation greater than the elevation of the probable fuel supply, an indicator, individual operating connections from the several floats reaching through the several vent tubes to the exteriors of the chambers, and a common connection from said individual operating connections to the indicator, operable to cause said indicator to read according to the position of the lowermost float, substantially as described.

19. In a device of the class described, the combination of a series of chambers for fuel, a common valve for said chambers to control the supply of fuel to and delivery of fuel from said chambers, connections intermediate between the several chambers and said valve, a fuel supply connection to the valve, a fuel delivery connection from the valve, a float in each chamber, a vent tube reaching upwards from the roof of each chamber, an indicator, individual operating connections from the several floats reaching up through the respective vent tubes, and a common connection from said individual connections to the indicator, operable to cause said indicator to read according to the position of the lowermost float, substantially as described.

20. In a device of the class described, the combination of a series of chambers for fuel, valve means for said chambers, to control the supply of fuel to and delivery of fuel from the respective chambers, a float in each chamber, a vent tube reaching upwards from the roof of each chamber, an indicator, individual operating connections from the several floats reaching up through the respective vent tubes, and a common connection from said individual connections to the indicator, operable to cause said indicator to read according to the position of the lowermost float, substantially as described.

21. In a device of the class described, the combination of a series of chambers for fuel, valve means for said chambers, to control the supply of fuel to and delivery of fuel from the respective chambers, a float in each chamber, a vent tube reaching upwards from the roof of each chamber, a rotary shaft in each chamber reaching up through the vent tube thereof, an operative connection from each float to its shaft serving to rotate the shaft in every instance to a position determined by the position of the float, a gear train exterior to the vent tubes, including a common gear member and another gear member individual to each vent tube and meshing with said common gear member, an indicator, connections from the common gear member thereto, and means in conjunction with each shaft and the corresponding gear member operable to move the gear train to a position dictated by the lowermost float, substantially as described.

22. In a device of the class described, the combination of a series of chambers for fuel, valve means for said chambers, to control the supply of fuel to and delivery of fuel from the respective chambers, a float in each chamber, a vent tube reaching upwards from the roof of each chamber, a rotary shaft in each chamber reaching up through the vent tube thereof, an operative connection from each float to its shaft serving to rotate the shaft in every instance to a position determined by the position of the float, an indicator, and a gear train intermediate between the indicator and the several shafts operable to move the indicator to the position dictated by the position of the lowermost float, substantially as described.

23. A metering device for the purpose specified including in combination a series of chambers of substantially equal size, a valve for controlling all of said chambers, a fuel supply connection to said valve, a fuel delivery connection from the valve, means for advancing the valve in proportion to one variable, indicating means, integrating means, means for causing the indicating means to indicate at all times in accordance with the level of liquid in that chamber containing the smallest amount of fuel, and means for causing the integrating means to integrate according to vertical movements of the liquid into different chambers, substantially as described.

24. In a device of the class described, the combination with an engine operatively connected to an element, a chamber for fuel, means for completely filling said chamber with the fuel, thereafter insuring delivery of fuel from said chamber for a determined unit amount of operation of said element, thereafter sealing said chamber against such delivery therefrom, a float in said chamber, an indicator, and means for causing said indicator to indicate according to the position of the float, substantially as described.

THOMAS A. BANNING, Jr.